(12) United States Patent
Yanagi

(10) Patent No.: US 8,516,248 B2
(45) Date of Patent: *Aug. 20, 2013

(54) COMMUNICATION APPARATUS

(75) Inventor: Satoru Yanagi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 365 days.

This patent is subject to a terminal disclaimer.

(21) Appl. No.: 12/726,737

(22) Filed: Mar. 18, 2010

(65) Prior Publication Data

US 2010/0250923 A1 Sep. 30, 2010

(30) Foreign Application Priority Data

Mar. 31, 2009 (JP) ................. 2009-084513

(51) Int. Cl.
*H04L 29/06* (2006.01)
(52) U.S. Cl.
USPC ............................ 713/162; 380/282; 380/283
(58) Field of Classification Search
USPC .................................. 380/282, 283; 713/162
See application file for complete search history.

(56) References Cited

U.S. PATENT DOCUMENTS

| 7,093,288 | B1 * | 8/2006 | Hydrie et al. | 726/13 |
| 7,512,791 | B1 * | 3/2009 | Sato | 713/166 |
| 7,733,512 | B2 * | 6/2010 | Kimura | 358/1.15 |
| 7,903,822 | B1 * | 3/2011 | Hair et al. | 380/282 |
| 8,059,818 | B2 * | 11/2011 | Asokan et al. | 380/277 |
| 2001/0005682 | A1 | 6/2001 | Terao | |
| 2002/0099941 | A1 | 7/2002 | Tanimoto | |
| 2003/0051146 | A1 | 3/2003 | Ebina et al. | |
| 2003/0099361 | A1 * | 5/2003 | Uchida | 380/277 |
| 2004/0212841 | A1 | 10/2004 | Endo | |
| 2006/0053278 | A1 | 3/2006 | Tanimoto | |
| 2007/0180236 | A1 | 8/2007 | Kuroyanagi et al. | |
| 2008/0056502 | A1 | 3/2008 | Okamoto | |

FOREIGN PATENT DOCUMENTS

| JP | 11-150554 | 6/1999 |
| JP | 2000-183951 | 6/2000 |
| JP | 2000-228727 | 8/2000 |
| JP | 2001-211306 | 8/2001 |
| JP | 2001-352338 | 12/2001 |
| JP | 2002-118546 | 4/2002 |
| JP | 2002-190796 | 7/2002 |
| JP | 2002-0219079 | 7/2002 |

(Continued)

OTHER PUBLICATIONS

Japanese Official Action dated Mar. 8, 2011 together with an English language translation from JP 2009-084513.

(Continued)

*Primary Examiner* — Amare F Tabor
(74) *Attorney, Agent, or Firm* — Scully, Scott, Murphy & Presser, P.C.

(57) ABSTRACT

A communication apparatus includes: a first storage unit configured to store a plurality of addresses of a plurality of first communication apparatuses; an acquiring unit configured to acquire a self-public key; a specifying unit configured to specify an address of at least one of the plurality of first communication apparatuses stored in the first storage unit when the self-public key is acquired; and a first public key sending unit configured to send the self-public key to the address of the at least one of the plurality of first communication apparatuses specified by the specifying unit.

12 Claims, 9 Drawing Sheets

| ADDRESS TABLE | | | S/MIME SETTING | | |
| --- | --- | --- | --- | --- | --- |
| | MAIL ADDRESS | NAME | CERTIFICATE | ENCRYPTION SENDING | CERTIFICATE DISTRIBUTION |
| 82 | device_a@mail.com | DEVICE A | STORED | ON | SENT |
| 84 | device_b@mail.com | DEVICE B | STORED | ON | SENT |
| 86 | device_c@mail.com | DEVICE C | NOT STORED | OFF | UNSENT |
| | ⋮ | ⋮ | ⋮ | ⋮ | ⋮ |
| 88 | device_z@mail.com | DEVICE Z | STORED | ON | UNSENT |

(56) References Cited

FOREIGN PATENT DOCUMENTS

| JP | 2002-368823 | 12/2002 |
|---|---|---|
| JP | 2003-229847 | 8/2003 |
| JP | 2003-318873 | 11/2003 |
| JP | 2005-141461 | 6/2005 |
| JP | 2006-60369 | 3/2006 |
| JP | 2006-074637 | 3/2006 |
| JP | 2007-004440 | 1/2007 |
| JP | 2007-168099 | 7/2007 |
| JP | 2007-208409 | 8/2007 |
| JP | 2007-208429 | 8/2007 |
| JP | 2007-318217 | 12/2007 |
| JP | 2008-058877 | 3/2008 |
| JP | 2010-232745 | 10/2010 |

OTHER PUBLICATIONS

Japanese Official Action dated Mar. 8, 2011 together with an English language translation from JP 2009-084512.

U.S. Official Action dated Sep. 7, 2012 from related application U.S. Appl. No. 12/732,966.

U.S. Official Action dated Mar. 14, 2013 from related U.S. Appl. No. 12/732,966.

\* cited by examiner

FIG. 3

ADDRESS TABLE 28

| MAIL ADDRESS 70 | NAME 72 | S/MIME SETTING 76 | | |
| --- | --- | --- | --- | --- |
| | | CERTIFICATE 74 | ENCRYPTION SENDING 78 | CERTIFICATE DISTRIBUTION 80 |
| device_a@mail.com | DEVICE A | STORED | ON | SENT |
| device_b@mail.com | DEVICE B | STORED | ON | SENT |
| device_c@mail.com | DEVICE C | NOT STORED | OFF | UNSENT |
| ... | ... | ... | ... | ... |
| device_z@mail.com | DEVICE Z | STORED | ON | UNSENT |

CERTIFICATE TABLE 30

| KIND | MAIL ADDRESS/NAME | CERTIFICATE DATA | SECRET KEY DATA |
|---|---|---|---|
| | 90 | 92 | 94 | 96 |
| CA CERTIFICATE | CA1 | AABBCC··· | NONE | ← 98 |
| CA CERTIFICATE | CA2 | DDEEFF··· | NONE | ← 102 |
| SELF-DEVICE CERTIFICATE | SELF-ADDRESS | ABC123··· | GHI789··· | ← 104 |
| DEVICE CERTIFICATE | user_a@mail.com | DEF456··· | NONE | ← 106 |
| ⋮ | ⋮ | ⋮ | ⋮ | |
| DEVICE CERTIFICATE | user_z@mail.com | XXYYZZ··· | NONE | ← 108 |

COMMUNICATION APPARATUS

CROSS-REFERENCE TO RELATED APPLICATIONS

This application claims priority from Japanese Patent Application No. 2009-084513 filed on Mar. 31, 2009, the entire subject matter of which is incorporated herein by reference.

TECHNICAL FIELD

The present invention relates to a communication apparatus, and specifically, to a communication apparatus capable of communication of data using an encryption technique.

BACKGROUND

With communicating data through the Internet, there is a fear of the data being falsified or being viewed by a third party, and there is a problem of ensuring security of data.

There has been proposed a known technique for encrypting data in order to prevent falsification of data or viewing of data by a third party. For example, a communication apparatus X encrypts data using a public key of a communication apparatus Y, and sends the encrypted data to the communication apparatus Y. The communication apparatus Y decodes the encrypted data by a self-secret key and acquires the data. Consequently, a third party can be prevented from sneaking a look at data.

SUMMARY

Illustrative aspects of exemplary embodiments of the present invention may provide the capability of increasing the possibility that a communication apparatus of the data sending side possesses a public key of a communication apparatus of the receiving party in the case of having to communicate data.

According to one illustrative aspect of the present invention, there is provided a communication apparatus comprising: a first storage unit configured to store a plurality of addresses of a plurality of first communication apparatuses; an acquiring unit configured to acquire a self-public key; a specifying unit configured to specify an address of at least one of the plurality of first communication apparatuses stored in the first storage unit when the self-public key is acquired; and a first public key sending unit configured to send the self-public key to the address of the at least one of the plurality of first communication apparatuses specified by the specifying unit.

According to another illustrative aspect of the present invention, there is provided a communication system comprising: a plurality of communication apparatuses, which communicate with one another, the plurality of communication apparatuses comprising a first communication apparatus, the first communication apparatus comprising: a first storage unit configured to store address information of each of the plurality of communication apparatuses; an acquiring unit configured to acquire a public key of the first communication apparatus; an inquiring unit configured to send inquiries to the plurality of communication apparatuses to determine whether encrypted communication using a public key is available; a receiving unit configured to receive from the plurality of communication apparatuses responses to the inquiries; and a public key sending unit which, upon receipt of the responses from the plurality of communication apparatus, sends the first public key to any of the plurality of communication apparatuses that indicated the encrypted communication using a public key is available.

BRIEF DESCRIPTION OF THE DRAWINGS

FIG. 3 shows one example of stored contents of an address table;

FIG. 4 shows one example of stored contents of a certificate table;

DETAILED DESCRIPTION

<General Overview>

Figure 1:
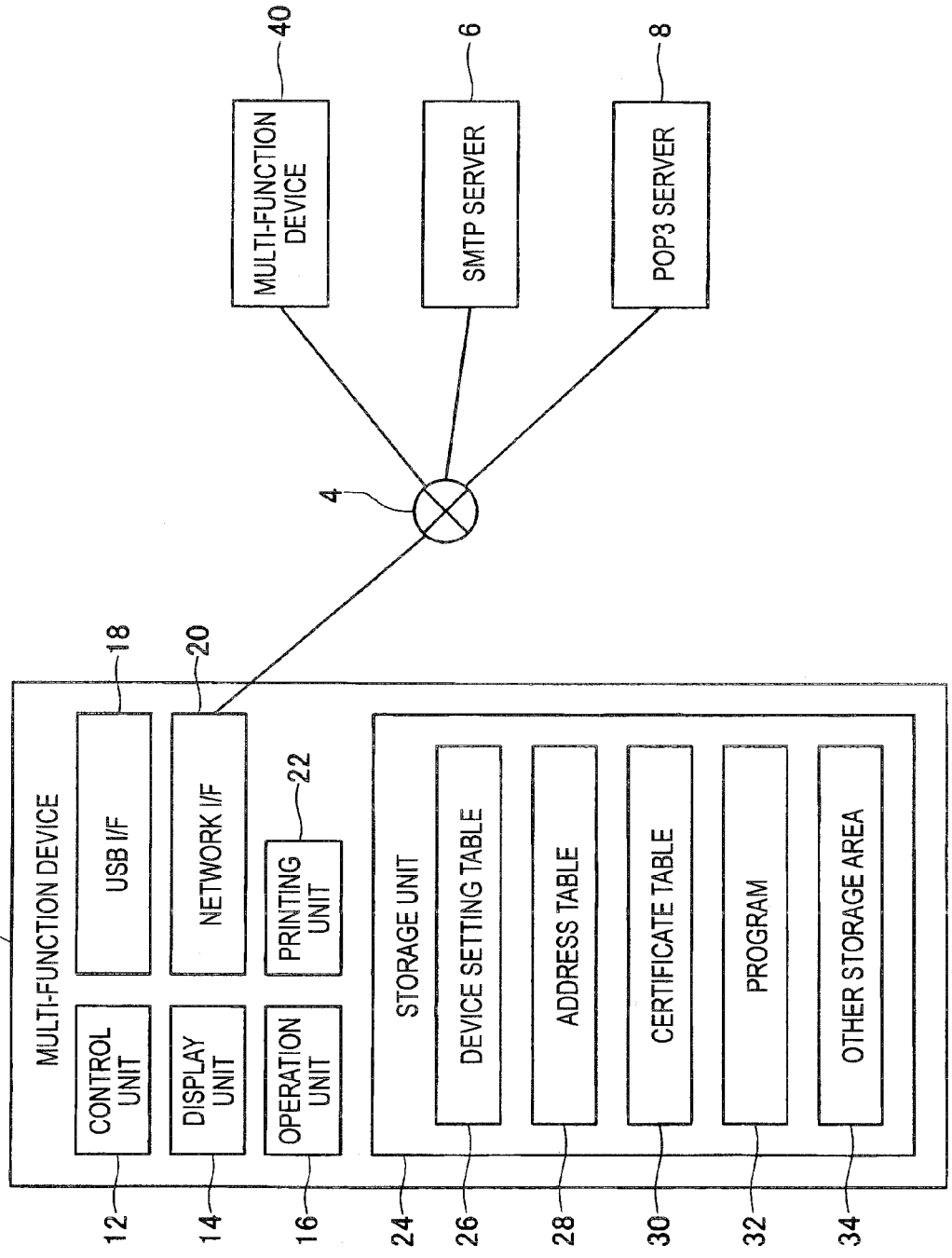
FIG. 1 shows a configuration of a multi-function device system.

When using an encryption technique, it becomes necessary to possess a public key of a communication opponent party of data. For example, in the known technique, the communication apparatus X cannot encrypt data, which will be sent to the communication apparatus Y, when the communication apparatus X does not possess the public key of the communication apparatus Y. That is, the encryption technique cannot be used when the communication apparatus of the data sending side does not possess a public key of the communication apparatus of a receiving party in the case of having to communicate data.

Therefore, illustrative aspects of exemplary embodiments of the present invention may provide the art capability of increasing the possibility that a communication apparatus of the data sending side possesses a public key of a communication apparatus of the receiving party in the case of having to communicate data.

The art disclosed by the present specification relates to a communication apparatus. The "communication apparatus" is the concept including all devices for executing communication processing. The communication processing may be processing for sending data or processing for receiving data. An example of the communication apparatus can include a personal computer (hereinafter called a PC), a server, a printer, a scanner, a copy machine, a facsimile, a multi-function device, etc. The communication apparatus includes a first storage unit, an acquiring unit, a specifying unit and a first public key sending unit.

An address of another communication apparatus is stored in the first storage unit. In addition, the term "a first storage unit" may mean, for example, an "address book". The term "address" described includes all addresses capable of communicating with another communication apparatus described above, and includes, for example, an electronic mail address, a network address, a node name, a MAC address, an IP address, etc. The acquiring unit acquires a self-public key. The specifying unit specifies an address of a communication apparatus stored in the first storage unit if the self-public key is acquired. The first public key sending unit sends the self-public key to the address of the communication apparatus specified by the specifying unit. In addition, the term "if" described above does not exclude the addition of other conditions (AND condition and/or OR condition). Other conditions may be added in the case of using the term "if". Hereinafter, the case of using the term "if" is similar.

That is, according to a first illustrative aspect of the invention, there is provided a communication apparatus comprising: a first storage unit configured to store a plurality of addresses of a plurality of first communication apparatuses; an acquiring unit configured to acquire a self-public key; a specifying unit configured to specify an address of at least one of the plurality of first communication apparatuses stored in the first storage unit when the self-public key is acquired; and a first public key sending unit configured to send the self-public key to the address of the at least one of the plurality of first communication apparatuses specified by the specifying unit.

According thereto, a self-public key can be sent by a first communication apparatus to an address of a second communication apparatus stored in the first storage unit of the first communication apparatus when the self-public key is acquired. Therefore, the possibility that the second communication apparatus possesses a public key of the first communication apparatus described above in the case of having to communicate (send and/or receive data) between the first communication apparatus and the second communication apparatus described above can be increased.

According to a second illustrative aspect of the invention, the communication apparatus further comprises: a command sending unit configured to send a command inquiring whether or not data can be communicated to the address of the at least one of the plurality of first communication apparatuses specified by the specifying unit using a public key; and a response receiving unit configured to receive from the at least one of the plurality of first communication apparatuses a response to the command, wherein the first public key sending unit sends the self-public key to the address of the at least one of the plurality of first communication apparatuses specified by the specifying unit when the response, which was received from the at least one of the plurality of first communication apparatuses by the response receiving unit, indicates that data can be communicated using the public key.

According thereto, the self-public key can be sent to a communication receiving party capable of communicating data using a public key. The self-public key is not sent to a communication receiving party incapable of communicating data using a public key and thereby, the public key can be prevented from being uselessly sent.

According to a third illustrative aspect of the invention, the communication apparatus farther comprises: a command receiving unit configured to receive a command inquiring whether or not data can be communicated using a public key; a response sending unit configured to send a response indicating whether or not the communication apparatus can communicate data using a public key to a second communication apparatus, which is a sending source of the command when the command is received; and a public key receiving unit configured to receive a public key from the second communication apparatus sent from the second communication apparatus according to the response indicating that the self-communication apparatus can communicate data using the public key.

According thereto, the public key can be received from an address of a communication receiving party when the communication apparatus described above can communicate data using a public key. When the communication apparatus described above cannot communicate data using a public key, the public key can be constructed so as to be uselessly sent from another communication apparatus.

According to a fourth illustrative aspect of the invention, the communication apparatus further comprises: a first selective permission unit configured to allow a user to select whether or not the communication apparatus communicates data using the public key; a second storage unit in which setting information corresponding to a selection result in the first selective permission unit is stored; and a first decision unit configured to determine whether or not the setting information stored in the second storage unit corresponds to a positive selection result when the command is received, wherein the response sending unit sends a response indicating that the communication apparatus can communicate data using a public key when a positive decision is made by the first decision unit.

According thereto, a user can determine whether or not a self-communication apparatus should communicate data using a public key.

According to a fifth illustrative aspect of the invention, the communication apparatus further comprises: a second decision unit configured to decide whether or not an address of the second communication apparatus was previously stored in the first storage unit when the command is received, wherein the response sending unit sends the response indicating that the self-communication apparatus can communicate data using a public key when a positive decision is made by the first decision unit and a positive decision is made by the second decision unit.

Communication of data using an encryption technique may want to be conducted with an address stored in the first storage unit. According to the configuration described above, when an address of a sending source of a command is stored in the first storage unit, a positive response can be sent to the sending source of the command.

According to a sixth illustrative aspect of the invention, the communication apparatus further comprises: a second selective permission unit configured to allow a user to select whether or not an address of the second communication apparatus is to be stored in the first storage unit when a negative decision is made by the second decision unit; and a first storage control unit configured to store the address of the second communication apparatus in the first storage unit when a positive selection result is obtained in the second selective permission unit, wherein the response sending unit sends the response indicating that the communication apparatus can communicate data using a public key when a negative decision is made by the second decision unit and a positive selection result is obtained in the second selective permission unit.

According thereto, when an address of a sending source of a command is not stored in the first storage unit, a user can determine whether or not the address of the sending source is stores in the first storage unit. Also, a positive response can be sent to the sending source of the command if the address of the sending source of the command is stored in the first storage unit.

According to a seventh illustrative aspect of the invention, the communication apparatus further comprises: a second public key sending unit configured to send a self-public key to a third communication apparatus when a public key of the third communication apparatus is received.

According thereto, a self-public key can be sent to another communication apparatus when a public key of another communication apparatus is received.

According to an eight illustrative aspect of the invention, the communication apparatus further comprises: a second storage control unit configured to store predetermined information in the first storage unit in a state of being associated with an address of a sending destination of a self-public key when the self-public key is sent by the first public key sending unit or the second public key sending unit, wherein the second public key sending unit sends a self-public key to the third communication apparatus when a public key of the third communication apparatus is received and the predetermined information is not stored in a state of being associated with an address of the third communication apparatus.

Incidentally, the "predetermined information" can include all pieces of information (for example, a flag) indicating that a self-public key is sent to an address of a sending destination.

According thereto, a self-public key is not sent to a third communication apparatus when the self-public key has been previously sent to the third communication apparatus in the case of receiving a public key of the third communication apparatus. As a result of this, the self-public key can be prevented from being sent plural times.

According to a ninth illustrative aspect of the invention, the communication apparatus further comprises: a third storage control unit configured to store a public key in the first storage unit in a state of being associated with an address of other communication apparatus when the public key of any other communication apparatus is received.

According thereto, a received public key can be associated with an address of the sending source of the public key.

According to a tenth illustrative aspect of the invention, the communication apparatus further comprises: an electronic mail sending unit configured to send electronic mail using a public key of a fourth communication apparatus to an address of the fourth communication apparatus when the public key of the fourth communication apparatus is stored in the first storage unit in a state of being associated with the address of the fourth communication apparatus to be used as a sending destination of the electronic mail.

According thereto, when a public key of an address of a sending destination of electronic mail is acquired in the case of sending the electronic mail, the electronic mail can be sent to its address using an encryption technique.

According to an eleventh illustrative aspect of the invention, the communication apparatus further comprises: a third public key sending unit for sending a self-public key to an address of a fifth communication apparatus when an address of the fifth communication apparatus is newly stored in the first storage unit.

According thereto, a self-public key can be sent to an address newly stored in the first storage unit.

According to a twelfth illustrative aspect of the invention, in the communication apparatus, wherein the acquiring unit acquires a device certificate including the self-public key from a specific certification authority, and the specifying unit specifies the at least one of the plurality of addresses of the plurality of first communication apparatuses stored in the first storage unit every time the acquiring unit acquires the device certificate from the specific certification authority, and the first public key sending unit sends the device certificate to the at least one of the plurality of addresses of the plurality of first communication apparatuses every time the specifying unit specifies the at least one of the plurality of addresses of the plurality of first communication apparatuses.

In the case of including a self-public key in a self-device certificate, for example, when the expiration date of the self-device certificate has passed, communication of data using an encryption technique cannot be conducted. In this case, communication of encrypted data can be conducted by acquiring a new device certificate in which the expiration date is updated from the certification authority. According to the configuration described above, a self-public key can be sent to an address of a second communication apparatus stored in the first storage unit every time the self-public key is acquired from the specific certification authority. As a result of this, for example, every time a self-device certificate is updated, the updated device certificate can be sent to the second communication apparatus.

According to a thirteenth illustrative aspect of the invention, there is provided a communication system comprising: a plurality of communication apparatuses, which communicate with one another, the plurality of communication apparatuses comprising a first communication apparatus, the first communication apparatus comprising: a first storage unit configured to store address information of each of the plurality of communication apparatuses; an acquiring unit configured to acquire a public key of the first communication apparatus; an inquiring unit configured to send inquiries to the plurality of communication apparatuses to determine whether encrypted communication using a public key is available; a receiving unit configured to receive from the plurality of communication apparatuses responses to the inquiries; and a public key sending unit which, upon receipt of the responses from the plurality of communication apparatus, sends the first public key to any of the plurality of communication apparatuses that indicated the encrypted communication using a public key is available.

According to a fourteenth illustrative aspect of the invention, in the communication system, wherein the plurality of communication apparatuses further comprises a second communication apparatus comprising: a second storage unit configured to store address information of each of the plurality of communication apparatuses; a determination unit which, upon receipt of one of the inquiries from the first communication apparatus, determines whether encrypted communication by the second communication apparatus is available or not; and a response sending unit configured to send a response indicating the results of the determination unit to the first communication apparatus.

EXEMPLARY EMBODIMENTS

Exemplary embodiments of the invention will now be described with reference to the drawings.

A part of the technique described in the following embodiment is listed.

(Mode 1) A communication apparatus may further include a permission unit for permitting a user to select whether or not a public key of another communication apparatus is stored in a first storage unit in a state of being associated with another communication apparatus when the public key of another communication apparatus is received.

(Mode 2) A communication apparatus may further include a data sending unit for encrypting digest data generated from specific data by a self-secret key and sending the encrypted digest data together with the specific data in the case of having to send specific data to an address (that is, a sending destination of a self-public key) of a first communication apparatus. In this case, the first communication apparatus may further include a verification unit for generating first digest data by decoding encrypted digest data using an acquired public key and generating second digest data by digesting the specific data and comparing the first digest data with the second digest data.

(Configuration of System)

FIG. 1 shows a schematic diagram of a multi-function device system 2 of the present embodiment. The multi-function device system 2 includes the Internet 4, plural multi-function devices 10, 40, an SMTP server 6 and a POP3 server 8. The plural multi-function devices 10, 40, the SMTP server 6 and the POP3 server 8 are connected to the Internet 4. In addition, in FIG. 1, only two multi-function devices 10, 40 are shown, but the number of multi-function devices can be changed properly.

(Encryption Technique by S/MIME)

The multi-function device 10 is a communication apparatus capable of communicating electronic mail using an encryption technique by S/MIME (Secure/Multipurpose Internet Mail Extensions). In addition, the multi-function device 40 has a configuration similar to that of the multi-function device 10.

A mechanism at the time of conducting communication of electronic mail using the encryption technique by S/MIME between the multi-function device 10 and the multi-function device 40 will hereinafter be described. The multi-function device 10 encrypts an electronic mail text using a common key and encrypts the common key by a public key of the multi-function device 40. Further, the multi-function device 10 sends electronic mail including the encrypted electronic mail text and the encrypted common key to the multi-function device 40. The public key of the multi-function device 40 is included in a device certificate of the multi-function device 40. It is necessary for the multi-function device 10 to previously acquire the device certificate of the multi-function device 40. In addition, information about the certification authority which is an issuing source of the device certificate of the multi-function device 40 and information about the expiration date of the device certificate, an electronic signature generated by the certification authority, etc. in addition to the public key of the multi-function device 40 may be included in the device certificate of the multi-function device 40. The multi-function device 40 decodes the encrypted common key by a self-secret key and acquires the common key. Further, the multi-function device 40 decodes the encrypted electronic mail text using the acquired common key and acquires the electronic mail text. Consequently, a third party can be prevented from sneaking a look at the electronic mail text.

In addition, the multi-function device 10 further attaches the following digest data to the electronic mail. That is, the multi-function device 10 generates digest data by digesting an electronic mail text and encrypts the digest data using a self-secret key and attaches the encrypted digest data to the electronic mail. The multi-function device 40 acquires first digest data by decoding the encrypted digest data using a public key of the multi-function device 10 included in a device certificate of the multi-function device 10. Therefore, it is necessary for the multi-function device 40 to previously acquire the device certificate of the multi-function device 10. The multi-function device 40 generates second digest data by digesting an electronic mail text by itself. The multi-function device 40 can detect an act of falsifying the electronic mail text by comparing the first digest data with the second digest data.

(Configuration of Multi-Function Device)

Subsequently, a configuration of the multi-function device 10 will be described in detail. The multi-function device 10 includes a control unit 12, a display unit 14, an operation unit 16, a USB interface 18, a network interface 20, a printing unit 22, a storage unit 24, etc. The control unit 12 executes processing according to a program 32 stored in the storage unit 24. The display unit 14 displays various pieces of information. The operation unit 16 includes plural keys. A user can input various instructions to the multi-function device 10 by operating the operation unit 16. USB memory (not shown) etc. may be connected to the USB interface 18. The network interface 20 is connected to the Internet 4. The printing unit 22 prints image data.

The storage unit 24 can store a device setting table 26, an address table 28 and a certificate table 30. The storage unit 24 further stores the program 32 to be executed by the control unit 12. Also, the storage unit 24 has a storage area 34 for storing information other than information 26, 28, 30, 32 described above.

(Stored Contents Device Setting Table)

Figure 2:
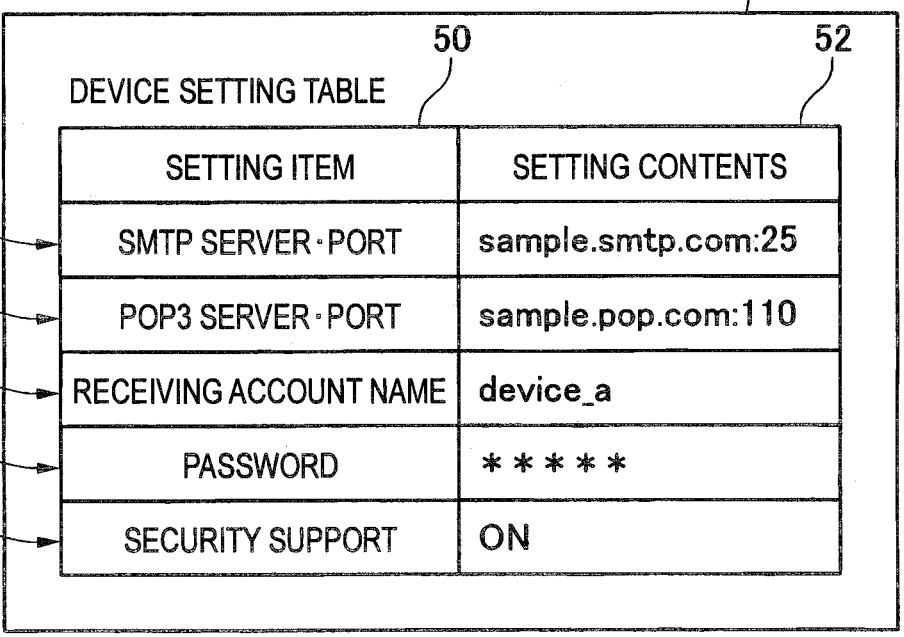
FIG. 2 shows one example of stored contents of a device setting table.

Subsequently, stored contents of the device setting table 26 (see FIG. 1) of the storage unit 24 will be described. FIG. 2 shows one example of the stored contents of the device setting table 26. The device setting table 26 includes plural pieces of combination information 54 to 62. Each of the pieces of combination information 54 to 62 is information in which a setting item 50 is associated with setting contents 52. The setting item 50 is a name of a kind of setting. Also, the setting contents 52 show the contents of setting. For example, in the combination information 54, an "SMTP server port", which is a name indicating combination of an address and a port number of an SMTP server 6, is written into the setting item 50 and "sample.smtp.com:25", which is combination of an actual address and a port number, is written into the setting contents 52. Also, combination information 62 is related to security support and in the example of FIG. 2, "ON" is written as the setting contents 52. For example, if the multi-function device 10 is in a state capable of communicating the electronic mail using the encryption technique, "ON" is written into the setting contents 52 of the security support. In contrast, if the multi-function device 10 is not in the state capable of communicating the electronic mail using the encryption technique, "OFF" is written into the setting contents 52 of the security support. Incidentally, in order to disable the multi-function device 10 from communicating the electronic mail using the encryption technique even though the multi-function device 10 is capable of communicating the electronic mail using the encryption technique, it is possible to set the setting content to "OFF". In this case, a user can select either "ON" or "OFF" by operating the operation unit 16.

(Stored Contents of Address Table)

Subsequently, stored contents of the address table 28 (see FIG. 1) of the storage unit 24 will be described. FIG. 3 shows one example of the stored contents of the address table 28. The address table 28 includes plural pieces of combination information 82 to 88. Each of the pieces of combination information 82 to 88 is information in which a mail address 70 is associated with a name 72 and S/MIME setting 76. The S/MIME setting 76 is a setting for using an encryption technique using S/MIME. The S/MIME setting 76 includes information about a certificate 74, encryption sending 78 and certificate distribution 80. The mail address 70 shows a stored mail address. In the embodiment, plural mail addresses are stored in the address table 28. The example of FIG. 3 illustrates four kinds of mail addresses. The name 72 shows a name of a device corresponding to each of the mail addresses. The certificate 74 shows information as to whether or not a device certificate of a communication apparatus corresponding to each of the mail addresses is stored in the multi-function device 10. When the device certificate is stored, "stored" is written and when the device certificate is not stored, "not stored" is written. The encryption sending 78 column shows information as to whether or not an electronic mail text is encrypted in the case of sending electronic mail to a communication apparatus corresponding to each of the mail addresses. When the text is encrypted, "ON" is written and when the text is not encrypted, "OFF" is written. A user can select either "ON" or "OFF" with respect to each of the mail addresses 70 by operating the operation unit 16. The certificate distribution 80 shows information as to whether or not a device certificate of the multi-function device 10 is sent to a communication apparatus corresponding to each of the mail addresses 70. When the device certificate of the multi-function device 10 is sent, "sent" is written and when the device certificate is not sent, "unsent" is written.

(Stored Contents of Certificate Table)

Subsequently, stored contents of the certificate table 30 (see FIG. 1) of the storage unit 24 will be described. FIG. 4 shows one example of the stored contents of the certificate table 30. The certificate table 30 includes plural pieces of combination information 98 to 108. Each of the pieces of combination information 98 to 108 is information in which a kind 90 is associated with a mail address/name 92, certificate data 94 and secret key data 96. The kind 90 shows a kind of the certificate. A "CA certificate" indicates certificate issued by the certification authority (CA). A "self-device certificate" indicates a device certificate of the multi-function device 10 acquired from the certification authority. A "device certificate" shows a device certificate received from an other communication apparatus. The mail address/name 92 shows a name of a certificate or a mail address corresponding to each of the certificates. For example, when a kind of certificate is "CA certificate", the name of the CA is stored. When a kind of certificate is the "self-device certificate", a mail address of the multi-function device 10 is stored. When a kind of certificate is the "device certificate", a mail address of the other communication apparatus is stored. The certificate data 94 may include all the data of various certificates. The secret key data 96 is a secret key of the multi-function device 10. Therefore, the secret key data 96 is not stored in the pieces of combination information 98, 102, 106 and 108 other than the "self-device certificate".

(Processing Executed by Multi-Function Device and Multi-Function Device)

Subsequently, processing executed by the multi-function device 10 and the multi-function device 40 will be described. FIGS. 5 to 9 show sequence diagrams of processing executed by the multi-function device 10 and the multi-function device 40. The multi-function device 10 reads out all the mail addresses 70 (see FIG. 3) stored in the address table 28 (S2) in the case of acquiring a self-device certificate (S1). In addition, the "case of acquiring a device certificate" in this embodiment means that, for example, the multi-function device 10 sends a request to a predetermined certification authority and the predetermined certification authority creates a device certificate of the multi-function device 10 in response to its request and sends the device certificate of the multi-function device 10 to the multi-function device 10. Alternatively, for example, a user can make the certification authority create a device certificate of the multi-function device 10 using an external device (for example, a PC) other than the multi-function device 10. The user could then store the device certificate of the multi-function device 10 acquired in the external device in USB memory. The user inserts the USB memory into the USB interface 18 (see FIG. 1). Consequently, the multi-function device 10 can acquire the device certificate of itself.

The multi-function device 10 sends inquiry commands (hereinafter called commands) 112, 114 of security support information to all the addresses read out. In addition, the commands in the embodiment are sent and received by electronic mail. When electronic mail is received, the multi-function device, which receives mail including a command, analyzes mail text automatically and executes the processing according to the command. In the embodiment, the command 112 is sent to the multi-function device 40 since an electronic mail address of the multi-function device 40 is stored in the address table 28. The multi-function device 40 receives the command 112 from the multi-function device 10. When the multi-function device 40 receives the command 112, the multi-function device 40 decides whether or not the security support setting (information corresponding to numeral 62 of FIG. 2 in the multi-function device 40) stored in a device setting table of a storage unit of the multi-function device 40 is "ON" (S4). In the case where the setting of security support is "OFF" (NO in S4), the multi-function device 40 proceeds to C of FIG. 6, and sends a response 126 indicating that the setting of security support is "OFF" to the multi-function device 10.

On the other hand, in the case where the setting of security support is "ON" (YES in S4), the multi-function device 40 decides whether or not an electronic mail address of a sending source (multi-function device 10) of the command 112 is stored in the address table (table corresponding to numeral 28 of FIG. 3 in the multi-function device 40) of the storage unit of the multi-function device 40 (S6). In the case where the electronic mail address is not stored (NO in S6), the multi-function device 40 proceeds to S8. The multi-function device 40 inquires of a user whether or not the electronic mail address of the multi-function device 10, which is the sending source of the command 112, is to be stored in the address table of the storage unit of the multi-function device 40 in S8. For example, the multi-function device 40 displays predetermined inquiry information on a display unit. It is unnecessary to conduct this inquiry of the user each time. When a user receives a command from an electronic mail address which is not stored in the address table, the user may store the setting regarding whether or not the electronic mail address of a sending source is to be stored in the address table and the multifunction device 40 may operate according to the setting.

A user of the multi-function device 40 can determine whether or not an electronic mail address of the multi-function device 10 is to be stored in an address table by operating the operation unit of the multi-function device 40. The multi-function device 40 decides whether or not the electronic mail address of the multi-function device 10 is to be stored in the address table according to the operation of the user (S8). In the case where the electronic mail address is not stored (NO in S8), the multi-function device 40 proceeds to C of FIG. 6. In the case where the electronic mail address is stored (YES in S8), the multi-function device 40 stores the electronic mail address of the multi-function device 10 in the address table of the storage unit (S10).

In the case where the address of the multi-function device 10 is stored in S10 or the case the case where the electronic mail address has been previously stored (YES in S6), the multi-function device 40 sends a response 116 indicating that the setting of security support is "ON" to the sending source (multi-function device 10) of the command 112. When the multi-function device 10 receives the response 116, the multi-function device 10 sends a device certificate 118 (hereinafter, a public key shall be included in a device certificate) including a public key of the multi-function device 10 to the multi-function device 40. When the multi-function device 10 sends the device certificate 118, the multi-function device 10 proceeds to A of FIG. 6. When the multi-function device 40 receives the device certificate 118 of the multi-function device 10, the multi-function device 40 proceeds to B of FIG. 6.

Figure 6:
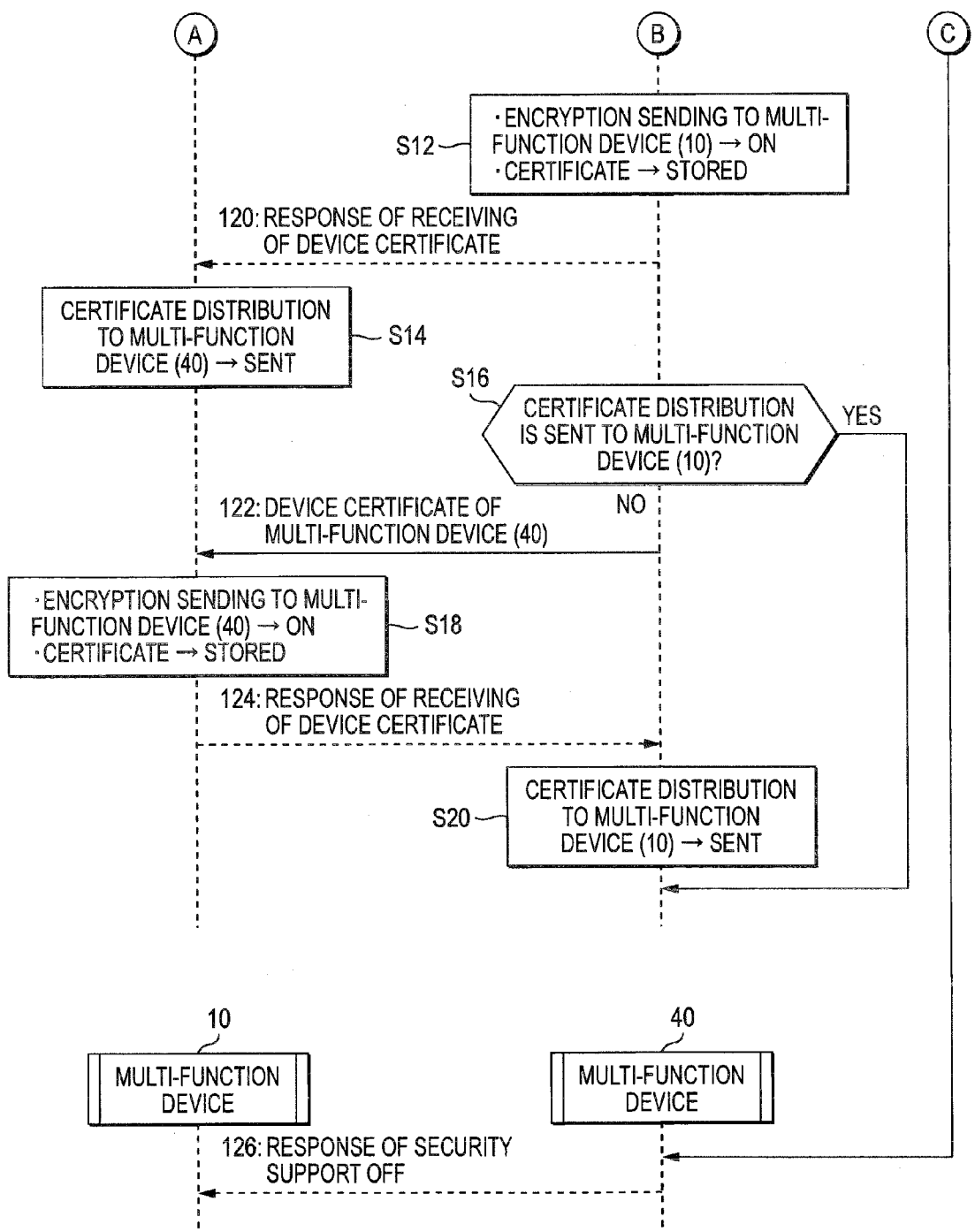
FIG. 6 shows a sequence diagram of processing executed subsequent to FIG. 5.

When the multi-function device 40 proceeds to B of FIG. 6, the multi-function device 40 changes the contents of storage of its own address table (S 12). That is, the multi-function device 40 turns "on" the setting (information corresponding to numeral 78 of FIG. 3 in the multi-function device 40) of encryption sending corresponding to the electronic mail address of the multi-function device 10. Also, setting (information corresponding to numeral 74 of FIG. 3 in the multi-function device 40) of a certificate corresponding to the electronic mail address of the multi-function device 10 is "stored" by the multi-function device 40. Further, the multi-function device 40 stores new combination information (information corresponding to numerals 98 to 108 in FIG. 4) including the received device certificate in the certificate table of the multi-function device 40 in S12. In addition, a user of the multi-function device 40 can switch ON/OFF the setting of encryption sending by operating the operation unit of the multi-function device 40. For example, the user can switch the setting of encryption sending to "OFF" when the expiration date of a device certificate has passed or when the CA of an issuer of a device certificate is unreliable.

Then, the multi-function device 40 sends a response 120, indicating that the device certificate of the multi-function device 10 has been received, to the multi-function device 10. When the multi-function device 10 receives the response 120, the multi-function device 10 changes the contents of the address table 28 of the storage unit 24 (S14). That is, setting 80 (see FIG. 3) of certificate distribution corresponding to the electronic mail address of the multi-function device 40 is set to "sent" by the multi-function device 10. When the multi-function device 40 sends the response 120 to the multi-function device 10, the multi-function device 40 decides whether or not a device certificate of the multi-function device 40 is sent to the multi-function device 10 (S16). In the case where the device certificate is has not been sent (YES in S16), the multi-function device 40 ends the processing. In the case where the device certificate has not been sent (NO in S16), the multi-function device 40 sends a device certificate 122 of its self (i.e. the device certificate 122 of the multi-function device 40) to the multi-function device 10. When the multi-function device 10 receives the device certificate 122 of the multi-function device 40, the multi-function device 10 changes the contents of the address table 28 of the storage unit 24 (S18). That is, the multi-function device 10 turns "on" the setting 78 (see FIG. 3) of encryption sending corresponding to the electronic mail address of the multi-function device 40. Also, the setting 74 (see FIG. 3) of a certificate corresponding to the electronic mail address of the multi-function device 40 is "stored" by the multi-function device 10. Further, the multi-function device 10 stores new combination information 98 to 108 including the received device certificate in the certificate table 30 (see FIG. 4) in S18. In addition, a user of the multi-function device 10 can switch ON/OFF of the setting 78 of encryption sending by operating the operation unit 16.

Then, the multi-function device 10 sends a response 124 indicating that the device certificate 122 of the multi-function device 40 is received by the multi-function device 40. When the multi-function device 10 sends the response 124, the multi-function device 10 ends the processing. When the multi-function device 40 receives the response 124, the multi-function device 40 changes the contents of storage of the address table of the storage unit of the multi-function device 40 (S20). That is, setting (information corresponding to numeral 80 of FIG. 3 in the multi-function device 40) of certificate distribution corresponding to the electronic mail address of the multi-function device 10 is "sent" by the multi-function device 40. When S20 ends, the multi-function device 40 ends the processing.

Figure 7:
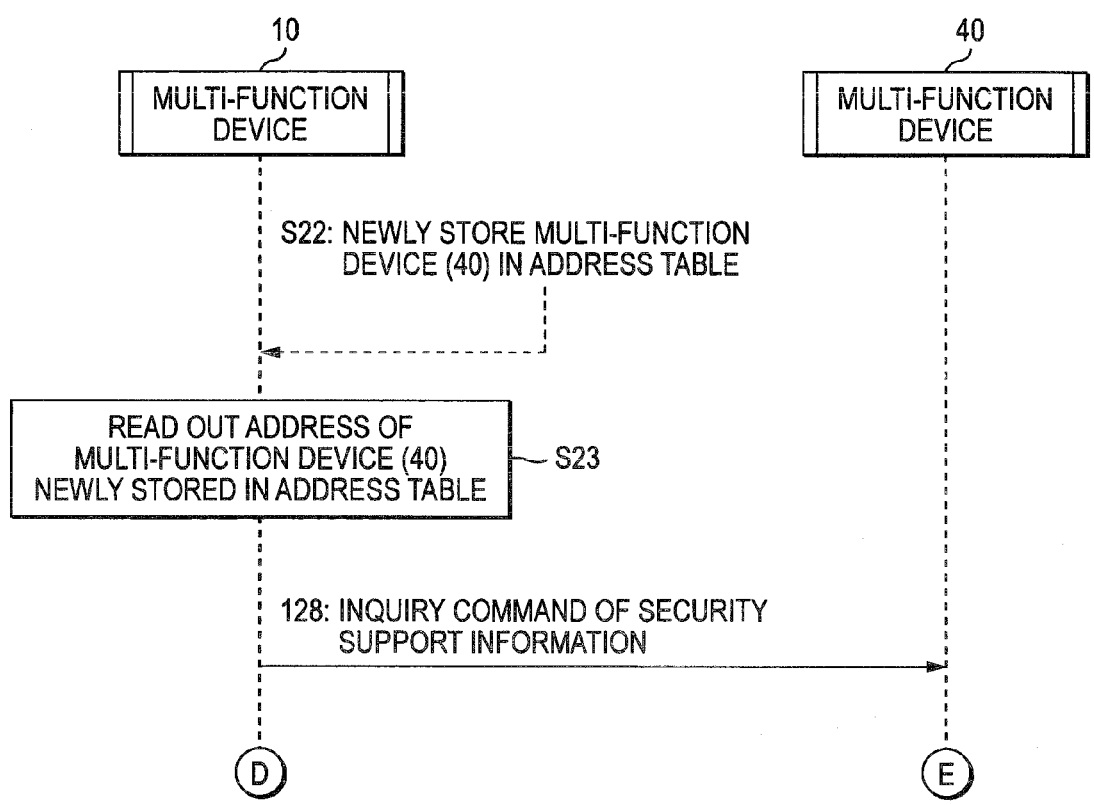
FIG. 7 shows a sequence diagram of processing executed by the two multi-function devices.

Subsequently, the sequence diagram of FIG. 7 will be described. For example, a user can store a new electronic mail address (an electronic mail address of the multi-function device 40 in the embodiment) in the address table 28 of the storage unit 24 by operating the operation unit 16. The multi-function device 10 reads out an address of the multi-function device 40 stored in the address table 28 (S23) when the address of the multi-function device 40 is newly stored in the address table 28 of the storage unit 24 (S22). The multi-function device 10 sends a command 128 to the address of the multi-function device 40 read out. When the multi-function device 10 sends the command 128, the multi-function device 10 proceeds to D of FIG. 5 and executes the communication processing described in the sequence diagrams of FIGS. 5 and 6. For example, the multi-function device 10 sends the device certificate 118 of the multi-function device 10 to the multi-function device 40 if a positive response 116 is received from the multi-function device 40. When the multi-function device 40 receives the command 128, the multi-function device 40 proceeds to E of FIG. 5 and executes the communication processing described in the sequence diagrams of FIGS. 5 and 6.

Figure 8:
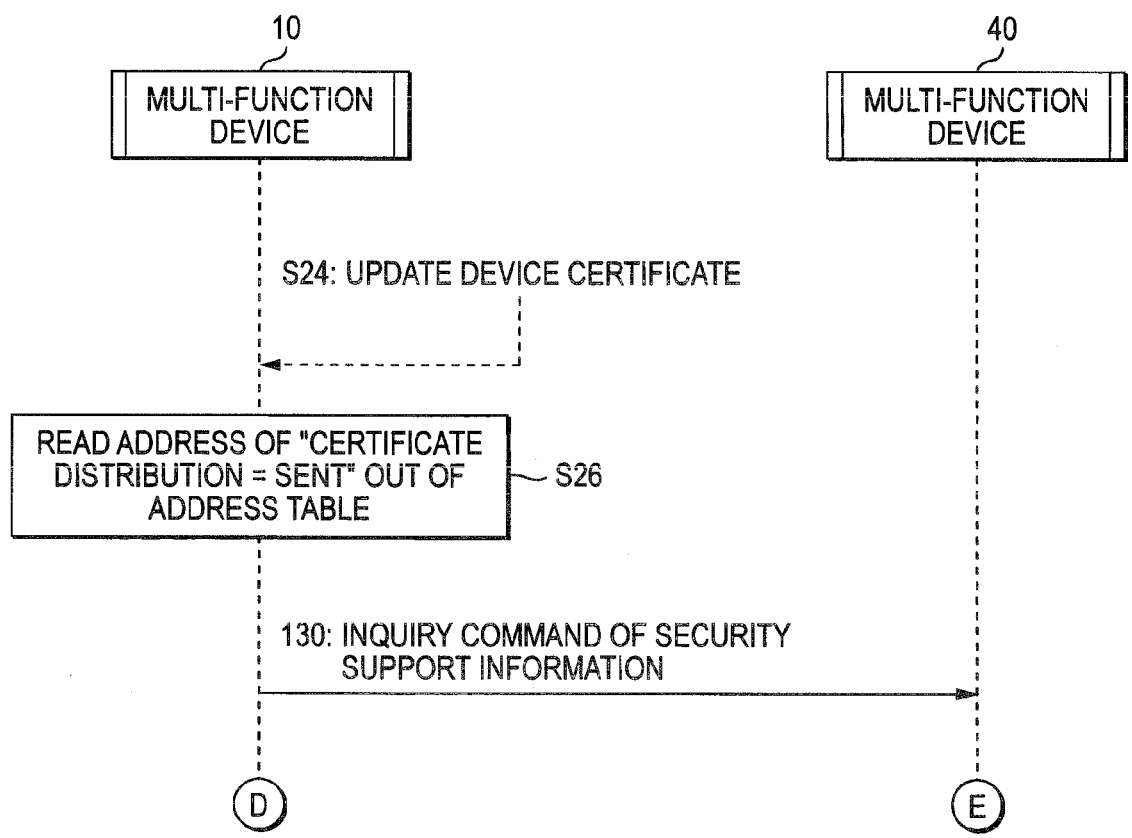
FIG. 8 shows a sequence diagram of processing executed by the two multi-function devices.

Subsequently, the sequence diagram of FIG. 8 will be described. For example, a user can update a device certificate of the multi-function device 10 by operating the operation unit 16. The multi-function device 10 reads all the addresses at which the setting 80 (see FIG. 3) of certificate distribution is "sent" out of the addresses stored in the address table 28 of the storage unit 24 (S26) when the device certificate of the multi-function device 10 is updated (S24). The multi-function device 10 sends a command 130 to all the addresses read out in the processing of S26. When the multi-function device 10 sends the command 130, the multi-function device 10 proceeds to D of FIG. 5 and executes the communication processing described in the sequence diagrams of FIGS. 5 and 6. When the multi-function device 40 receives the command 130, the multi-function device 40 proceeds to E of FIG. 5 and executes the communication processing described in the sequence diagrams of FIGS. 5 and 6.

Figure 9:
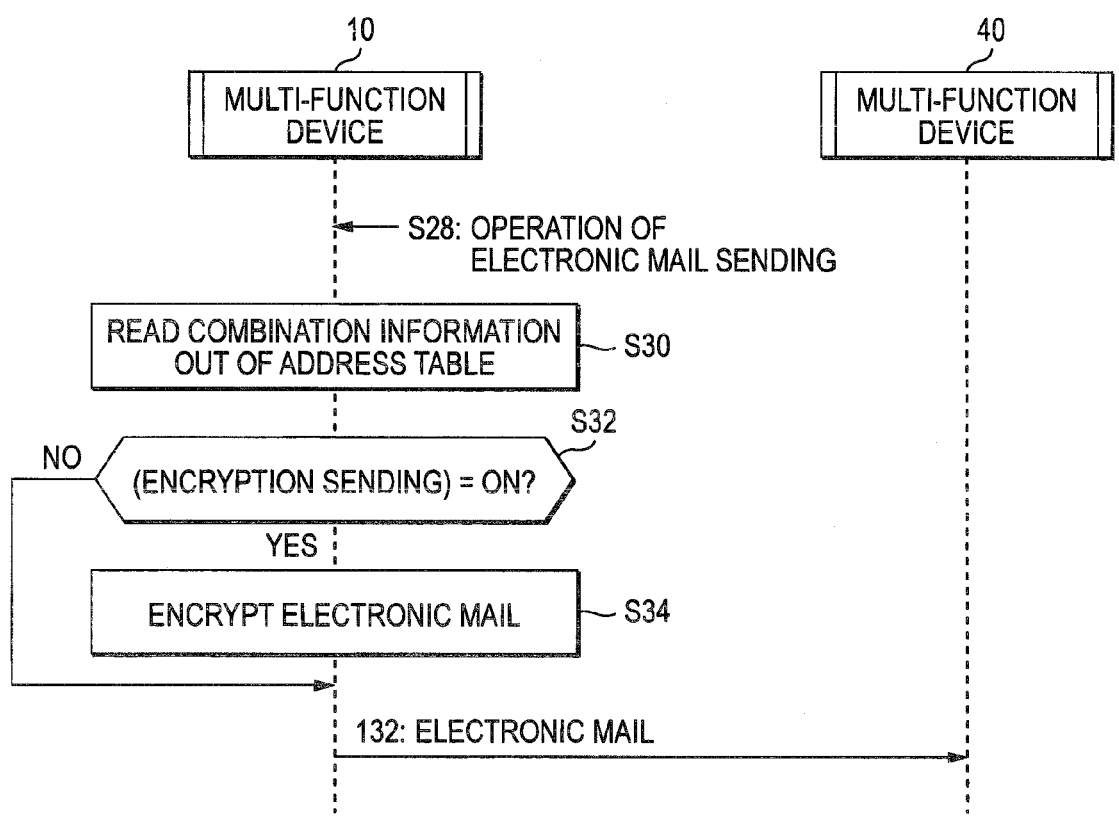
FIG. 9 shows a sequence diagram of processing executed by the two multi-function devices.

Subsequently, the sequence diagram of FIG. 9 will be described. For example, a user can execute an operation (S28) for sending electronic mail in the operation unit 16. The user can specify an electronic mail address (an electronic mail address of the multi-function device 40 in the embodiment) of a sending destination of electronic mail from the address table 28. In this case, the multi-function device 10 reads combination information (for example, combination information 82) including the specified electronic mail address out of the address table 28 of the storage unit 24 (S30).

Then, the multi-function device 10 decides whether or not the setting 78 (see FIG. 3) of encryption sending of the combination information read out is turned "on" (S32). In the case where the setting 78 of encryption sending is "ON" (the case of YES in S32), the multi-function device 10 encrypts electronic mail. That is, the multi-function device 10 encrypts an electronic mail text using a predetermined common key. Further, the multi-function device 10 specifies the certificate data 94 (see FIG. 4) corresponding to an electronic mail address of the multi-function device 40 from the certificate table 30 and specifies a public key of the multi-function device 40 from the certificate data 94. Then, the multi-function device 10 encrypts the common key by the public key of the multi-function device 40 and attaches the encrypted common key to electronic mail (S34). Further, the multi-function device 10 generates digest data by digesting an electronic mail text and encrypts the digest data using a self-secret key and attaches the encrypted digest data to the electronic mail.

Then, the multi-function device 10 sends electronic mail 132 to the multi-function device 40. In addition, in the case where the setting 78 (see FIG. 3) of encryption sending is "OFF" (the case of NO in S32), the multi-function device 10 sends the electronic mail 132 to the multi-function device 40 without encrypting the electronic mail 132.

When the multi-function device 40 receives the electronic mail 132, the multi-function device 40 decodes the electronic mail 132 when the electronic mail 132 is encrypted. That is, the multi-function device 40 decodes the encrypted common key attached to the electronic mail 132 by the self-secret key and acquires the common key. Further, the multi-function device 40 decodes the encrypted electronic mail text using the acquired common key and acquires the electronic mail text. Also, the multi-function device 40 specifies a device certificate of the multi-function device 10 from its own certificate table and specifies a public key of the multi-function device 10 from the device certificate. Then, the multi-function device 40 acquires first digest data by decoding the encrypted digest data attached to the electronic mail 132 using a public key of the multi-function device 10 included in the device certificate of the multi-function device 10. The multi-function device 40 generates second digest data by digesting an electronic mail text by itself. The multi-function device 40 compares the first digest data with the second digest data. When the two digest data 40 do not match, the multi-function device 40 executes first processing (for example, warning display). Alternatively, when the two digest data 40 match, the multi-function device 40 executes second processing (for example, printing processing of the electronic mail text) different from the first processing.

Figure 5:
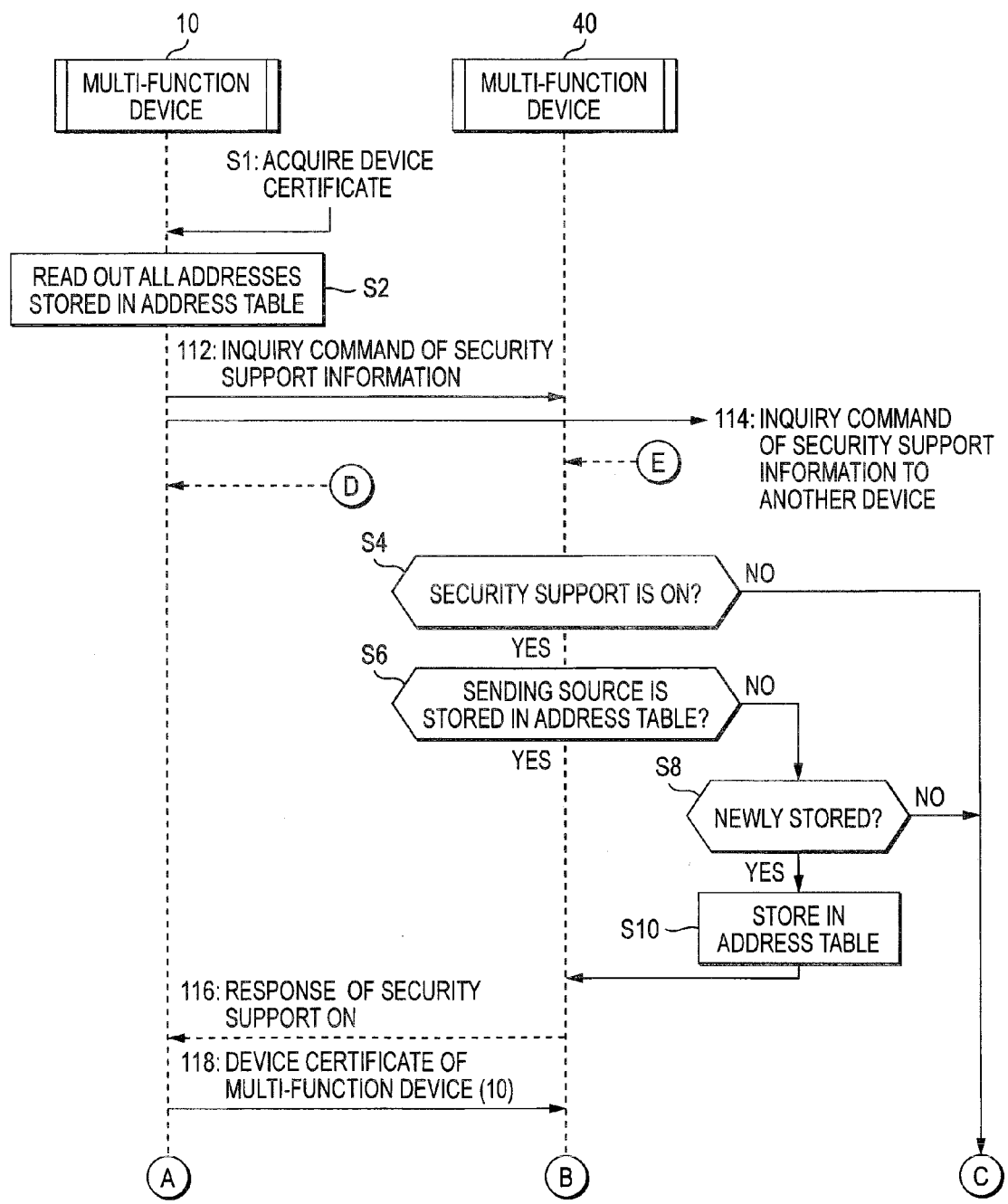
FIG. 5 shows a sequence diagram of processing executed by multi-function devices.

In addition, in the embodiment, the command 112 is sent from the multi-function device 10 to the multi-function device 40 in FIG. 5, but when the multi-function device 40 acquires a device certificate of its self (the device certificate of the multi-function device 40), a command is sent from the multi-function device 40 to the multi-function device 10. In this case, the subject of each processing disclosed in FIGS. 5 and 6 is reversed. Also, in FIGS. 7 to 9, the subject of each processing may be reversed.

The multi-function device system 2 of the embodiment has been described in detail. When the multi-function device 10 acquires a self-device certificate (device certificate of multi-function device 10), the multi-function device 10 can send the self-device certificate including a public key in an address of the multi-function device 40 stored in the address table 28. Also, when a new address is stored in the address table 28, the self-device certificate can be sent to its address. Further, when the self-device certificate is updated, the self-device certificate can be sent to an address at which setting of encryption sending becomes "ON". As a result of this, the possibility that the multi-function device 10 acquires a device certificate of the multi-function device 40 can be increased in the case of communicating electronic mail encrypted using an encryption technique by S/MIME. The fact that the multi-function device 10 acquires the self-device certificate expects that there will be a high possibility of communicating electronic mail using the encryption technique using the acquired self-device certificate in this multi-function device 10 in future. Even in such a case, when the multi-function device 10 does not notify the multi-function device 40 that the multi-function device 10 acquires the device certificate of the self (multi-function device 10), the multi-function device 40 cannot know whether or not the multi-function device 10 acquires the device certificate of its self (multi-function device 10). In this case, there is a high possibility that electronic mail sent from the multi-function device 40 to the multi-function device 10 is not encrypted. In the embodiment, when the multi-function device 10 acquires the self-device certificate, that is, when the multi-function device 10 makes setting for conducting communication using the encryption technique, the multi-function device 10 sends the device certificate (including a public key of the multi-function device 10) of the multi-function device 10, which needed for the multi-function device 40 to send the encrypted electronic mail to the multi-function device 10, to the multi-function device 40. As a result of that, the multi-function device 40 can send the encrypted electronic mail to the multi-function device 10. Also, when the self-device certificate is updated, the multi-function device 10 can send the self-device certificate to the addresses at which the setting 80 of certificate distribution is "sent" from among the electronic mail addresses stored in the address table 28. Therefore, the multi-function device 10 can make, for example, the multi-function device 40 update the device certificate of the multi-function device 10 to the newest device certificate. Moreover, the multi-function device 10 can be prevented from uselessly sending the self-device certificate to, for example, the address at which setting of security support becomes "OFF" by sending the self-device certificate only to the addresses at which the setting 80 of certificate distribution is "sent".

Also, the multi-function device 10 can send the self-device certificate to only the opponent party in which setting of encryption sending becomes "ON". As a result of this, the self-device certificate is not sent to the receiving party incapable of communicating data using the device certificate. Thus, the device certificate can be prevented from being uselessly sent.

Also, the multi-function device 10 can receive a device certificate of the multi-function device 40 from a mail address of the multi-function device 40 only when the multi-function device 10 can communicate data using a device certificate. As a result of this, the device certificate is not sent uselessly from the multi-function device 40 when the multi-function device 10 cannot communicate data using the device certificate.

Also, a user can determine whether or not to communicate data using a self-device certificate in the multi-function device 10.

Also, the multi-function device 10 can send a positive response to the multi-function device 40 only when a mail address of the multi-function device 10 is stored in the address table 28 in the case of receiving an inquiry command of security support information from the multi-function device 40.

Also, a user can determine whether or not the multi-function device 10 stores a mail address of the multi-function device 40 in the address table 28 when the mail address of the multi-function device 40 is not stored in the address table 28 in the case of receiving an inquiry command of security support information from the multi-function device 40. Also, a positive response can be sent to the multi-function device 40 if the mail address of the multi-function device 40 is stored in the address table 28.

Also, the multi-function device 10 can send a self-device certificate to the multi-function device 40 when a device certificate of the multi-function device 40 is received from the multi-function device 40. The device certificate can be stored mutually between the multi-function device 10 and the multi-function device 40.

Also, in the multi-function device 10, a self-device certificate is not sent to the multi-function device 40 when the self-device certificate has been previously sent in the case of receiving the device certificate of the multi-function device 40 from the multi-function device 40. As a result of this, the self-device certificate can be prevented from being sent plural times.

Also, the multi-function device 10 can associate a received device certificate with a mail address of a sending source of its device certificate and store the mail address in the address table 28 and the certificate table 30.

The embodiment of the invention has been described above in detail, but this embodiment is only illustrative and the claims are not limited thereby. The art described in the claims includes various modifications and changes of the concrete examples illustrated above.

For example, the timing at which a self-device certificate is sent is not limited to the "case of acquiring the self-device certificate", and may be, for example, the timing at which the self-device certificate is acquired and setting of security support of a device setting table is turned "on". The contents of setting of this security support may be constructed so as to be automatically set to "ON" when the self-device certificate is acquired.

Also, in the embodiment, the multi-function device 10 acquires a device certificate of the multi-function device 40 from the multi-function device 40 after a self-device certificate is sent, but the invention is not limited to that case and, for example, the multi-function device 40 may send the device certificate of the multi-function device 40 to the multi-function device 10 together with the response 116 indicating that setting of security support of the multi-function device 40 is "ON". Then, the multi-function device 10 may send the device certificate 118 of the multi-function device 10 and also send the response 124 indicating that the device certificate of the multi-function device 40 is received to the multi-function device 40. Consequently, a load of communication between the multi-function device 10 and the multi-function device 40 is reduced.

The technical elements described in the present specification or the drawings exert technical utility singly or various combinations, and are not limited to combinations described in the claims at the time of the application. Also, the art illustrated in the present specification or the drawings can simultaneously achieve plural purposes, and the achievement itself of one of the purposes has technical utility.

What is claimed is:

1. A communication apparatus comprising:
    a first storage configured to store a plurality of addresses of a plurality of first communication apparatuses;
    a second storage in which setting information corresponding to a selection result is stored; and
    a processor configured to execute computer readable instructions to provide:
        an acquiring unit configured to acquire a self-public key;
        a specifying unit configured to specify an address of at least one of the plurality of first communication apparatuses stored in the first storage when the self-public key is acquired;
        a first public key sending unit configured to send the self-public key to the address of the at least one of the plurality of first communication apparatuses specified by the specifying unit;
        a command receiving unit configured to receive a command inquiring whether or not data can be communicated using a public key;
        a response sending unit configured to send a response indicating whether or not the communication apparatus can communicate data using a public key to a second communication apparatus, which is a sending source of the command when the command is received;
        a public key receiving unit configured to receive a public key from the second communication apparatus sent from the second communication apparatus according to the response indicating that the self-communication apparatus can communicate data using the public key;
        a first selective permission unit configured to allow a user to select whether or not the communication apparatus communicates data using the public key; and
        a first decision unit configured to determine whether or not setting information stored in the second storage corresponds to a positive selection result in the first selective permission unit when the command is received,
    wherein the response sending unit sends a response indicating that the communication apparatus can communicate data using a public key when a positive decision is made by the first decision unit.

2. The communication apparatus according to claim 1, further comprising:
    a command sending unit configured to send a command inquiring whether or not data can be communicated to the address of the at least one of the plurality of first communication apparatuses specified by the specifying unit using a public key; and
    a response receiving unit configured to receive from the at least one of the plurality of first communication apparatuses a response to the command,
    wherein the first public key sending unit sends the self-public key to the address of the at least one of the plurality of first communication apparatuses specified by the specifying unit when the response, which was received from the at least one of the plurality of first communication apparatuses by the response receiving unit, indicates that data can be communicated using the public key.

3. The communication apparatus according to claim 1, further comprising:
    a second decision unit configured to decide whether or not an address of the second communication apparatus was previously stored in the first storage when the command is received,
    wherein the response sending unit sends the response indicating that the self-communication apparatus can communicate data using a public key when a positive decision is made by the first decision unit and a positive decision is made by the second decision unit.

4. The communication apparatus according to claim 3, further comprising:
    a second selective permission unit configured to allow a user to select whether or not an address of the second communication apparatus is to be stored in the first storage when a negative decision is made by the second decision unit; and
    a first storage control unit configured to store the address of the second communication apparatus in the first storage when a positive selection result is obtained in the second selective permission unit,
    wherein the response sending unit sends the response indicating that the communication apparatus can communicate data using a public key when a negative decision is made by the second decision unit and a positive selection result is obtained in the second selective permission unit.

5. The communication apparatus according to claim 1, further comprising:
a second public key sending unit configured to send a self-public key to a third communication apparatus when a public key of the third communication apparatus is received.

6. The communication apparatus according to claim 5, further comprising:
a second storage control unit configured to store predetermined information in the first storage in a state of being associated with an address of a sending destination of a self-public key when the self-public key is sent by the first public key sending unit or the second public key sending unit,
wherein the second public key sending unit sends a self-public key to the third communication apparatus when a public key of the third communication apparatus is received and the predetermined information is not stored in a state of being associated with an address of the third communication apparatus.

7. The communication apparatus according to claim 1, further comprising:
a third storage control unit configured to store a public key in the first storage in a state of being associated with an address of other communication apparatus when the public key of any other communication apparatus is received.

8. The communication apparatus according to claim 7, further comprising:
an electronic mail sending unit configured to send electronic mail using a public key of a fourth communication apparatus to an address of the fourth communication apparatus when the public key of the fourth communication apparatus is stored in the first storage in a state of being associated with the address of the fourth communication apparatus to be used as a sending destination of the electronic mail.

9. The communication apparatus according to claim 1, further comprising:
a third public key sending unit for sending a self-public key to an address of a fifth communication apparatus when an address of the fifth communication apparatus is newly stored in the first storage.

10. The communication apparatus according to claim 1, wherein the acquiring unit acquires a device certificate including the self-public key from a specific certification authority, and the specifying unit specifies the at least one of the plurality of addresses of the plurality of first communication apparatuses stored in the first storage every time the acquiring unit acquires the device certificate from the specific certification authority, and the first public key sending unit sends the device certificate to the at least one of the plurality of addresses of the plurality of first communication apparatuses every time the specifying unit specifies the at least one of the plurality of addresses of the plurality of first communication apparatuses.

11. A communication system comprising:
a plurality of communication apparatuses, which communicate with one another, the plurality of communication apparatuses comprising a first communication apparatus, the first communication apparatus comprising:
a first storage configured to store address information of each of the plurality of communication apparatuses;
a second storage in which setting information corresponding to a selection result is stored; and
a processor configured to execute computer readable instructions to provide:
an acquiring unit configured to acquire a public key of the first communication apparatus;
an inquiring unit configured to send inquiries to the plurality of communication apparatuses to determine whether encrypted communication using a public key is available;
a receiving unit configured to receive from the plurality of communication apparatuses responses to the inquiries;
a public key sending unit which, upon receipt of the responses from the plurality of communication apparatus, sends the first public key to any of the plurality of communication apparatuses that indicated the encrypted communication using a public key is available;
a command receiving unit configured to receive a command inquiring whether or not data can be communicated using a public key;
a response sending unit configured to send a response indicating whether or not the communication apparatus can communicate data using a public key to a second communication apparatus, which is a sending source of the command when the command is received;
a public key receiving unit configured to receive a public key from the second communication apparatus sent from the second communication apparatus according to the response indicating that the self-communication apparatus can communicate data using the public key;
a first selective permission unit configured to allow a user to select whether or not the communication apparatus communicates data using the public key; and
a first decision unit configured to determine whether or not the setting information stored in the second storage corresponds to a positive selection result in the first selective permission unit when the command is received,
wherein the response sending unit sends a response indicating that the communication apparatus can communicate data using a public key when a positive decision is made by the first decision unit.

12. The communication system according to claim 11, wherein the plurality of communication apparatuses further comprises a second communication apparatus comprising:
a third storage configured to store address information of each of the plurality of communication apparatuses; and
a processor configured to execute computer readable instructions to provide:
a determination unit which, upon receipt of one of the inquiries from the first communication apparatus, determines whether encrypted communication by the second communication apparatus is available or not; and
a response sending unit configured to send a response indicating the results of the determination unit to the first communication apparatus.

* * * * *